United States Patent
Dextreit et al.

(10) Patent No.: US 9,637,125 B2
(45) Date of Patent: May 2, 2017

(54) VEHICLE AND METHOD OF CONTROL THEREOF

(71) Applicant: Jaguar Land Rover Limited, Coventry (GB)

(72) Inventors: Clement Dextreit, Coventry (GB); Mark Ellis, Coventry (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/650,670

(22) PCT Filed: Dec. 10, 2013

(86) PCT No.: PCT/EP2013/076079
§ 371 (c)(1),
(2) Date: Jun. 9, 2015

(87) PCT Pub. No.: WO2014/090799
PCT Pub. Date: Jun. 19, 2014

(65) Prior Publication Data
US 2015/0307099 A1 Oct. 29, 2015

(30) Foreign Application Priority Data
Dec. 10, 2012 (GB) .................................. 1222180.0

(51) Int. Cl.
*B60L 9/00* (2006.01)
*G05D 1/00* (2006.01)
(Continued)

(52) U.S. Cl.
CPC .............. *B60W 30/16* (2013.01); *B60K 6/48* (2013.01); *B60W 10/08* (2013.01);
(Continued)

(58) Field of Classification Search
CPC combination set(s) only.
See application file for complete search history.

(56) References Cited

U.S. PATENT DOCUMENTS 4,706,195 A * 11/1987 Yoshino ............. B60K 31/0008
180/169
5,014,200 A * 5/1991 Chundrlik .......... B60K 31/0008
180/167

(Continued)

FOREIGN PATENT DOCUMENTS

DE 10 017662 A1 10/2001
DE 10 234064 A1 2/2004
(Continued)

OTHER PUBLICATIONS

Notice of Reason(s) for Rejection, Japan Patent Application No. 2015-546056, Jun. 14, 2016, 12 pages.

*Primary Examiner* — Bhavesh V Amin
(74) *Attorney, Agent, or Firm* — Myers Bigel, P.A.

(57) ABSTRACT

The invention relates to an adaptive cruise control (ACC) system for a host motor vehicle having regenerative braking means (122) and non-regenerative braking means. The system is operable to control a powertrain and the braking means of the host vehicle to maintain the vehicle at a target distance (d_target) behind the followed vehicle, the target distance being substantially equal to a second distance that is greater than a first distance (d_driver); and employ substantially only the regenerative braking means and not the non-regenerative braking means to slow the host vehicle when the host vehicle is greater than the first distance (d_driver) behind the followed vehicle and the ACC system determines that braking is required to maintain the vehicle at the target distance.

18 Claims, 3 Drawing Sheets

(51) Int. Cl.
*B60W 30/16* (2012.01)
*B60K 6/48* (2007.10)
*B60W 10/08* (2006.01)
*B60W 10/184* (2012.01)
*B60W 30/18* (2012.01)
*B60W 50/00* (2006.01)
*B60W 50/08* (2012.01)

(52) U.S. Cl.
CPC .... *B60W 10/184* (2013.01); *B60W 30/18127* (2013.01); *B60W 50/085* (2013.01); *B60K 2006/4825* (2013.01); *B60K 2310/26* (2013.01); *B60K 2310/262* (2013.01); *B60W 50/0097* (2013.01); *B60W 50/082* (2013.01); *B60W 2550/302* (2013.01); *B60W 2550/308* (2013.01); *B60W 2750/308* (2013.01); *Y02T 10/6221* (2013.01); *Y02T 10/6252* (2013.01); *Y02T 10/7258* (2013.01); *Y10S 903/93* (2013.01)

(56) References Cited

U.S. PATENT DOCUMENTS

| | | | | |
|---|---|---|---|---|
| 5,173,859 A | * | 12/1992 | Deering | B60K 31/0008 180/271 |
| 5,375,060 A | * | 12/1994 | Nocker | B60K 31/0008 180/169 |
| 5,749,426 A | * | 5/1998 | Gilling | B60K 31/0008 180/167 |
| 5,882,093 A | * | 3/1999 | Enomoto | B60L 7/26 188/156 |
| 5,934,399 A | * | 8/1999 | Iiboshi | B60K 31/0008 180/169 |
| 5,938,714 A | * | 8/1999 | Satonaka | B60K 26/04 180/169 |
| 6,009,368 A | * | 12/1999 | Labuhn | B60K 31/0008 123/352 |
| 6,081,763 A | * | 6/2000 | Smith | B60K 31/0008 701/93 |
| 6,122,588 A | | 9/2000 | Shehan et al. | |
| 6,311,121 B1 | * | 10/2001 | Kuragaki | B60K 31/0008 180/167 |
| 6,622,810 B2 | * | 9/2003 | Labuhn | B60K 31/0008 180/169 |
| 2003/0028311 A1 | * | 2/2003 | Seto | B60K 31/0008 701/96 |
| 2003/0085066 A1 | * | 5/2003 | Labuhn | B60K 31/0008 180/167 |
| 2004/0129470 A1 | * | 7/2004 | Huelser | B60K 6/485 180/170 |
| 2004/0140143 A1 | | 7/2004 | Saeki et al. | |
| 2007/0222287 A1 | * | 9/2007 | Crombez | B60L 7/18 303/151 |
| 2009/0145673 A1 | * | 6/2009 | Soliman | B60K 6/442 180/65.1 |
| 2009/0321165 A1 | * | 12/2009 | Haug | B60W 20/00 180/65.275 |
| 2010/0198450 A1 | * | 8/2010 | Shin | B60W 30/16 701/31.4 |
| 2010/0198478 A1 | * | 8/2010 | Shin | B60W 10/06 701/96 |
| 2010/0256835 A1 | * | 10/2010 | Mudalige | G08G 1/22 701/2 |
| 2010/0324752 A1 | * | 12/2010 | Suganuma | B60W 40/06 701/1 |
| 2011/0066342 A1 | * | 3/2011 | Ozaki | B60T 7/042 701/70 |
| 2011/0160972 A1 | * | 6/2011 | Crombez | B60T 7/042 701/70 |
| 2011/0246012 A1 | | 10/2011 | McClain | |
| 2012/0074767 A1 | * | 3/2012 | Nishio | B60T 1/10 303/3 |
| 2012/0265409 A1 | * | 10/2012 | Takeda | B60W 50/0225 701/48 |
| 2013/0090822 A1 | * | 4/2013 | Schwindt | B60K 31/0008 701/70 |
| 2015/0314775 A1 | * | 11/2015 | Dextreit | B60W 20/19 701/22 |

FOREIGN PATENT DOCUMENTS

| | | |
|---|---|---|
| DE | 10 2011 050739 A1 | 12/2012 |
| EP | 1 065 090 B1 | 8/2006 |
| JP | 2001-010371 A | 1/2001 |
| JP | 2004-217175 A | 8/2004 |
| JP | 2004-270512 A | 9/2004 |
| JP | 2007 168502 A | 7/2007 |
| JP | 2007-186045 A | 7/2007 |
| JP | 2007 291919 A | 11/2007 |
| JP | 2009-029388 A | 2/2009 |
| JP | 2009 078590 A | 4/2009 |
| JP | 2010-143462 A | 7/2010 |
| JP | 2011-091935 A | 5/2011 |
| KR | 2012 0107663 A | 10/2012 |
| WO | WO 2014/009108 A1 | 1/2014 |

* cited by examiner

PRIOR ART

VEHICLE AND METHOD OF CONTROL THEREOF

RELATED APPLICATIONS

This application is a 35 U.S.C. §371 national stage application of PCT Application No. PCT/EP2013/076079, filed on Dec. 10, 2013, which claims priority from Great Britain Patent Application No. 1222180.0, filed on Dec. 10, 2012, the contents of which are incorporated herein by reference in their entireties. The above-referenced PCT International Application was published in the English language as International Publication No. WO 2014/090799 A1 on Jun. 19, 2014.

FIELD OF THE INVENTION

The present invention relates to a vehicle and a method of control thereof. Embodiments of the invention relate to vehicles having adaptive cruise control and regenerative braking capability and in particular but not exclusively to electric vehicles and to hybrid electric vehicles. Aspects of the invention relate to an apparatus or system, to a vehicle controller, to a vehicle, and to a method.

BACKGROUND

It is known to provide a motor vehicle having an adaptive (or active) cruise control (ACC) system. The primary function of the ACC system is to maintain the vehicle travelling at a cruising speed that corresponds to a driver requested target cruise speed as in a conventional cruise control system. ACC systems have the added feature that they may modulate the target speed if a vehicle ahead is travelling at a lower speed. In such a scenario an ACC system may be configured to control a powertrain of the vehicle and a foundation braking system of the vehicle in such a manner as to maintain a driver desired distance behind a followed vehicle that is travelling at a speed less than the driver requested target cruise speed.

SUMMARY OF THE INVENTION

Embodiments of the invention may be understood with reference to the appended claims.

Aspects of the present invention provide a cruise control apparatus or system, a vehicle controller, a vehicle and a method.

In one aspect of the invention for which protection is sought there is provided an adaptive cruise control (ACC) apparatus or system for a host motor vehicle having regenerative braking means and non-regenerative braking means, the apparatus or system being operable to receive a command from a user automatically to maintain the host vehicle substantially at a first distance behind a followed vehicle, the apparatus or system being operable to control a powertrain and the braking means of the host vehicle to maintain the vehicle at a target distance behind the followed vehicle, the target distance being greater than the first distance, wherein when the host vehicle is greater than the first distance behind the followed vehicle and the ACC apparatus or system determines that braking is required, the apparatus or system is operable to employ substantially only the regenerative braking means and not the non-regenerative braking means to slow the host vehicle.

According to an aspect of the present invention for which protection is sought there is provided an adaptive cruise control (ACC) apparatus or system for a host vehicle having regenerative and non-regenerative braking means, the system being operable, in response to a user command to maintain the host vehicle a first distance behind a followed vehicle, to control a powertrain of the host vehicle to maintain the host vehicle at a target distance behind the followed vehicle, the target distance being greater than the first distance by an amount sufficient to permit the host vehicle to be slowed by the regenerative braking means only in order to maintain the host vehicle at or more than the first distance behind the followed vehicle.

According to an aspect of the invention for which protection is sought there is provided an adaptive cruise control (ACC) system for a host motor vehicle having regenerative braking means and non-regenerative braking means, the system being operable to:

control a powertrain and the braking means of the host vehicle to maintain the vehicle at a target distance behind the followed vehicle, the target distance being substantially equal to a second distance that is greater than a first distance; and employ substantially only the regenerative braking means and not the non-regenerative braking means to slow the host vehicle when the host vehicle is greater than the first distance behind the followed vehicle and the ACC system determines that braking is required to maintain the vehicle at the target distance.

Embodiments of the present invention may have the advantage that a motor vehicle having regenerative braking means, such as an electric vehicle or a hybrid electric vehicle, may be driven with ACC functionality in a more energy efficient manner.

It is to be understood that conventional ACC systems control a powertrain of a vehicle to apply positive or negative torque to wheels of the vehicle by means of an engine and a friction braking system in order to maintain a substantially constant distance behind a followed vehicle. An amount of torque applied by the friction braking system may be relatively high in some situations in order precisely to maintain the desired distance. Friction brakes are an example of a non-regenerative braking system and their use results in a wastage of energy that might otherwise be recovered by a regenerative braking system. If a prior art ACC system is employed in an electric vehicle or hybrid electric vehicle, it is found that friction braking is applied frequently in typical deployment scenarios in order to maintain the driver desired distance behind the followed vehicle.

Embodiments of the present invention may have the advantage that a motor vehicle having regenerative braking means, such as an electric vehicle or a hybrid electric vehicle, may be driven with ACC functionality in a more energy efficient manner. This is because the ACC system is operable to 'relax' the requirement to maintain the host vehicle at the first distance behind the followed vehicle, and instead to maintain the host vehicle at a target distance that is greater than the first distance. The control system applies substantially only regenerative braking means when the host vehicle is a distance behind the followed vehicle that is greater than the first distance. This is found to reduce usage of friction braking by increasing the extent to which regenerative braking alone is able to accommodate braking action commanded by the ACC system.

In other words, in order to improve efficiency of operation of a vehicle having regenerative braking means, by using regenerative braking means in preference to friction braking means, embodiments of the present invention increase the distance that the ACC system seeks to maintain behind the followed vehicle to a target prescribed distance that is greater than the first prescribed distance. It is found that more gentle braking may then be employed (which the regenerative braking means is capable of providing) in order to maintain the distance from the followed vehicle substantially equal to the target distance. This results in increased efficiency of operation.

For example while, as explained above, it is known in conventional adaptive cruise control systems to modulate the friction brakes in order to maintain the host vehicle approximately at the desired distance behind a followed vehicle, in the present invention such modulation may be achieved using only the regenerative braking means, since by setting a target distance to be greater than the desired distance, this allows for potentially a reduced retardation effect of regenerative brakes compared with friction brakes.

It is to be understood that the value of the target distance may be tuned in dependence on the amount of brake torque the regenerative braking means is capable of providing.

It is to be understood that vehicles according to some embodiments may be operable in some situations to employ non-regenerative braking means even when the distance behind the followed vehicle is greater than the first prescribed distance. For example in the event it is detected that the followed vehicle is executing an emergency braking manoeuvre, friction braking may be employed to increase the rate of deceleration of the host vehicle. However, in many common scenarios it is found that regenerative braking alone may be employed to maintain a distance of at least the first distance behind the followed vehicle if a suitable value of the target distance is selected. As discussed below, a value of the target distance may be selected to be a value enabling regenerative braking alone to maintain a distance between the host and followed vehicles that is between the first and target distances. The ACC system may monitor a rate of deceleration of the followed vehicle and determine an expected rate of deceleration based on measured values. The ACC system may then calculate a suitable value of target distance in dependence on the measured values in order to enable the system to maintain the vehicle at a distance between the first and target distances using regenerative braking alone. The expected value may correspond to a mean average value of a rate of deceleration of the followed vehicle, a mode average value, a median average value, a maximum observed value or any other suitable value.

Advantageously the system may be configured to determine the first distance by reference at least in part to an input provided by a user.

Advantageously the system may be operable to allow a user to select the first distance from a plurality of respective different distances.

The distances may be selected by means of a selector, for example a selector allowing a first or a second or optionally a further alternative distance to be selected. The distances may for example be referred to as 'distance 1', 'distance 2' and so forth. The distances may be substantially fixed distances, or distances determined by the ACC system in dependence on one or more parameters.

Advantageously the system may be operable wherein a value of the first distance is dependent on a speed of the host vehicle.

Further advantageously the system may be operable to allow a user to set the first distance to be a distance corresponding substantially to the current distance behind the followed vehicle.

Advantageously, the ACC system may be operable to control the powertrain such that a blended combination of the regenerative and non-regenerative braking means is employed to slow the host vehicle when required when the distance behind the followed vehicle is less than the first distance.

Advantageously the value of the target distance determined by the ACC system may be dependent on at least one selected from amongst the first distance, a mass of the host vehicle, an inclination of a driving surface, a charging torque limit of the regenerative braking means, a state of charge of a charge storage device charged by the regenerative braking means, and a speed of the host vehicle.

By charging torque limit is meant a maximum amount of braking torque the regenerative braking means is capable of providing, the amount of braking torque being dependent on the amount of charge the regenerative braking means may generate. The amount of charge will depend on the electric machine and may depend on the state of charge of a charge storage device charged by the electric machine such as a battery.

It is to be understood that one or more of the values of vehicle mass, driving surface inclination, charging torque limit and vehicle speed may be estimated values. For example vehicle mass may be estimated responsive to an amount of vehicle acceleration obtained for a given powertrain torque. Driving surface inclination information may be obtained based on data stored in a database as a function of vehicle location, for example a map database in combination with vehicle location determining means such as GPS (Global satellite Positioning System), GPRS (Global Packet Radio Service) or any other suitable means. Alternatively the inclination information may be obtained from an inclination sensor, or one or more other techniques. A value of charging torque limit of the regenerative braking means may be an actual value reported by one or more vehicle functions such as a vehicle controller, generator controller or the like. Alternatively the charging torque limit may be an estimated value. The estimated value may be obtained for example based on a history of usage of regenerative braking means or one or more components thereof, and/or battery state of charge (SOC). For example in the case that the regenerative braking means includes an electric machine, a charging torque limit of the electric machine may be reduced due to excessive use, for example during regenerative braking operations, and/or if the battery SOC exceeds a threshold value. Alternatively or in addition, in the case where the same electric machine is also operated as a propulsion motor, the estimated value of charging torque limit may be determined taking into account a history of use of the electric machine as a propulsion motor.

Optionally the ACC system may be operable to determine a value of a gap parameter, the gap parameter being a distance that is to be added to the first distance in order to obtain the target distance.

Further optionally the value of the gap parameter may be responsive to a value of a maximum vehicle deceleration rate that is available by means of the regenerative braking means, the value of the gap parameter being arranged to increase as the maximum available deceleration rate decreases.

Thus if the maximum available rate of deceleration of the vehicle increases, i.e. as the vehicle is able to reduce speed more quickly, the value of the gap parameter may decrease.

Optionally the value of the gap parameter may be dependent at least in part on a value of an expected rate of deceleration of the followed vehicle, the value of the gap parameter being arranged to increase with increasing values of expected rate of deceleration. Thus, the ACC system may be configured or operable to monitor a driving style, especially a driving speed, of the followed vehicle.

The expected rate of deceleration may be a value the followed vehicle is expected to assume in the event the followed vehicle decelerates. The expected rate may be calculated based on historical data in respect of measured values of rate of deceleration of the followed vehicle.

In certain alternative embodiments the ACC system may be configured or operable wherein the gap parameter is independent of the driving speed of the host vehicle.

Advantageously the ACC system may be configured wherein an amount by which the target distance may exceed the first distance is limited to a maximum prescribed increment value.

This feature has the advantage that the ACC system may prevent the distance between followed and following (host) vehicle becoming excessive.

The value of the gap parameter may be limited to the value of the maximum prescribed increment value.

Advantageously the system may be operable in a first mode to maintain the vehicle at a target distance behind the followed vehicle substantially equal to the second distance and in a second mode to maintain the vehicle at a target distance behind the followed vehicle substantially equal to the first distance.

The system may be configured to permit a user to select a mode of operation from amongst the first and second modes. For example in some embodiments a selector dial, button or switch may be provided for selecting between the first and second modes.

Optionally, the first or second mode may be selected automatically by the vehicle in dependence on a mode of operation of one or more systems of the vehicle. For example the first or second mode may be selected automatically by the vehicle in dependence on the mode of operation of a powertrain of the vehicle.

The powertrain may be operable in a mode in which the engine remains permanently switched on. This mode may be referred to as a hybrid-inhibit mode, for example, since operation in EV mode is inhibited. When the powertrain is operated in such a mode, the vehicle may automatically select operation of the ACC system in the second mode.

If the powertrain is operated in an EV-only mode or a hybrid mode in which the engine is switched on and off according to an energy management strategy to reduce emissions, the vehicle may automatically select operation of the ACC system in the first mode.

The vehicle may be operable to allow a user to over-ride automatic selection of the first or second modes and allow a user to specify operation in the first or second mode, according to a user's requirement.

The ACC system may be operable to employ the non-regenerative braking means to slow the vehicle in order to maintain the first distance behind the followed vehicle.

The second mode may be assumed for example if a user requires a more performance orientated driving experience or when operating in particularly busy traffic conditions.

In some embodiments, in the second mode the ACC system no longer prevents application of the non-regenerative braking means (such as friction braking means) and allows non-regenerative braking means to be employed in addition to friction braking means. As noted above the ACC system sets the target distance equal to the first distance and not the second distance, and allows use of non-regenerative braking and regenerative braking means (alone or in combination) to slow the vehicle in order to maintain the vehicle substantially at the first distance behind the followed vehicle.

It is to be understood that reference to maintaining a certain distance behind a followed vehicle does not require that the ACC system maintain precisely the predetermined distance at every moment in time whilst following a vehicle travelling at a speed below the target speed. Fluctuations in speed of the followed vehicle require a corresponding adjustment in speed of the following vehicle, and a variation in distance behind the followed vehicle is inevitable as the vehicle control system responds to the fluctuations in speed. However, the ACC system detects changes in the distance behind the followed vehicle, for example by means of radar or acoustic distance measuring apparatus, and controls the braking system and powertrain in response to detected changes in the distance in order to attempt to maintain the vehicle at the target distance behind the followed vehicle.

In an aspect of the invention for which protection is sought there is provided a vehicle controller comprising an ACC apparatus or system according to any preceding aspect or any embodiment thereof.

In an aspect of the invention for which protection is sought there is provided a vehicle comprising an ACC apparatus or system or a vehicle controller according to any respective preceding aspect or any embodiment thereof.

The vehicle may be an electric vehicle (EV) not having an internal combustion engine.

Alternatively the vehicle may be a hybrid electric vehicle. The hybrid electric vehicle may have an internal combustion engine and at least one electric propulsion motor.

In an aspect of the invention for which protection is sought there is provided a method of controlling by means of a control system a host vehicle having a powertrain and regenerative and non-regenerative braking means, comprising:

controlling the powertrain and the braking means of the host vehicle to maintain the vehicle at a target distance behind the followed vehicle, the target distance being substantially equal to a second distance that is greater than a first distance; and when braking is required to maintain the target distance, employing substantially only the regenerative braking means and not the non-regenerative braking means to slow the host vehicle when an actual distance behind the followed vehicle is greater than the first distance.

In an aspect of the invention for which protection is sought there is provided a method of controlling a host vehicle having regenerative and non-regenerative braking means implemented by a control system, comprising: receiving a command from a user to maintain a first distance behind a followed vehicle; controlling a powertrain of the host vehicle to maintain the vehicle at a target distance behind the followed vehicle, wherein the target distance is greater than the first distance; and employing substantially only the regenerative braking means and not the non-regenerative braking means to slow the host vehicle when the distance of the host vehicle behind the followed vehicle is greater than the first distance.

In an aspect of the invention for which protection is sought there is provided a motor vehicle comprising: a powertrain comprising at least one electric propulsion motor, regenerative braking means and non-regenerative braking means; and an adaptive cruise control (ACC) system operable to allow a driver to input an indication of a first prescribed distance corresponding to a distance the driver desires the vehicle to maintain behind a followed vehicle, the ACC system being operable to control the powertrain to maintain the vehicle at a distance between the first and a second prescribed distance behind the followed vehicle, the second prescribed distance being a distance that is greater than the first prescribed distance.

In an aspect of the invention for which protection is sought there is provided a method of controlling a vehicle having a powertrain comprising at least one electric propulsion motor, regenerative braking means and non-regenerative braking means, the method comprising: receiving by means of adaptive cruise control (ACC) system an indication of a first prescribed distance corresponding to a distance a driver desires the vehicle to maintain behind a followed vehicle; and controlling the powertrain by means of the ACC system to maintain the host vehicle at a distance between the first and a second prescribed distance behind the followed vehicle, the second prescribed distance being a distance that is greater than the first prescribed distance.

In an aspect of the invention for which protection is sought there is provided a motor vehicle comprising: regenerative braking means; an adaptive cruise control (ACC) system operable to allow a driver to indicate a desired distance that is to be maintained behind a followed vehicle, the ACC means being operable to determine an ECO cruise distance being an actual distance that is to be maintained behind the followed vehicle, the ECO cruise distance being a distance determined responsive to a value of the driver desired distance, the ECO cruise distance being greater than the driver desired distance.

In an aspect of the invention for which protection is sought there is provided a motor vehicle comprising: regenerative braking means; and an adaptive cruise control (ACC) system operable to allow a driver to indicate a desired distance that is to be maintained behind a followed vehicle, wherein the ACC system is operable to maintain an actual distance of the vehicle from the followed vehicle that is greater than the driver desired distance, the ACC system being operable preferentially to employ regenerative braking to slow the vehicle when the actual distance from the followed vehicle is greater than the driver desired distance.

As mentioned above, in some embodiments of the invention the distance that the ACC system seeks to maintain behind the followed vehicle is increased to a second prescribed distance that is greater than the first prescribed distance the value of which may be indicated by the driver. It is found that more gentle braking may then be employed (provided by the regenerative braking means) in order to maintain the distance from the followed vehicle at a value between the first and second prescribed distances without a requirement to employ friction braking means. This results in increased efficiency of operation.

Thus, in an aspect of the invention for which protection is sought there is provided an adaptive cruise control (ACC) system for a host motor vehicle having regenerative braking means and non-regenerative braking means, the system being operable to receive a command from a user automatically to maintain the host vehicle substantially at a first distance behind a followed vehicle, the system being operable in turn to control a powertrain and the braking means of the host vehicle to maintain the vehicle at a target distance behind the followed vehicle, the target distance being greater than the first distance.

Embodiments of the present invention may have the advantage that a motor vehicle having regenerative braking means, such as an electric vehicle or a hybrid electric vehicle, may be driven with ACC functionality in a more energy efficient manner.

In an aspect of the invention for which protection is sought there is provided a vehicle control system operable to receive a signal corresponding to a distance a driver wishes to remain behind a followed vehicle (driver desired distance), the system being operable to relax or increase this distance by a delta distance. The delta distance may be a function of vehicle speed, gradient and vehicle mass in order to enable regenerative braking alone to achieve sufficient braking to maintain the vehicle at a distance from the followed vehicle that is between the driver desired distance and the driver desired distance plus the delta distance.

Some embodiments of the invention provide an adaptive cruise control (ACC) system for a host motor vehicle having regenerative and non-regenerative braking means. The ACC system may be operable to allow a user to command the ACC system to maintain the host vehicle at a first distance behind a followed vehicle. The ACC system may in turn control a powertrain of the host vehicle to maintain the vehicle at a target distance behind the followed vehicle, the target distance being greater than the first distance. The ACC system may be operable to employ substantially only the regenerative braking means and not the non-regenerative braking means to slow the host vehicle when the host vehicle is greater than the first distance behind the followed vehicle.

Some embodiments of the present invention provide an adaptive cruise control (ACC) system for a host motor vehicle having regenerative braking means and non-regenerative braking means. The system may be operable to control a powertrain and the braking means of the host vehicle to maintain the vehicle at a target distance behind the followed vehicle. The target distance may be substantially equal to a second distance that is greater than a first distance. The system may employ substantially only the regenerative braking means and not the non-regenerative braking means to slow the host vehicle when the host vehicle is greater than the first distance behind the followed vehicle and the ACC system determines that braking is required to maintain the vehicle at the target distance.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described with reference to one embodiment are applicable to all embodiments, unless such features are incompatible.

BRIEF DESCRIPTION OF THE DRAWINGS

One or more embodiments of the invention will now be described, by way of example only, with reference to the accompanying drawings in which:

FIG. 3 is (a) a schematic illustration showing a hybrid electric vehicle according to an embodiment of the present invention behind a followed vehicle and (b) a plot of deceleration rate imposed by an ACC system according to an embodiment of the present invention as a function of distance from the followed vehicle.

DETAILED DESCRIPTION

Figure 1:
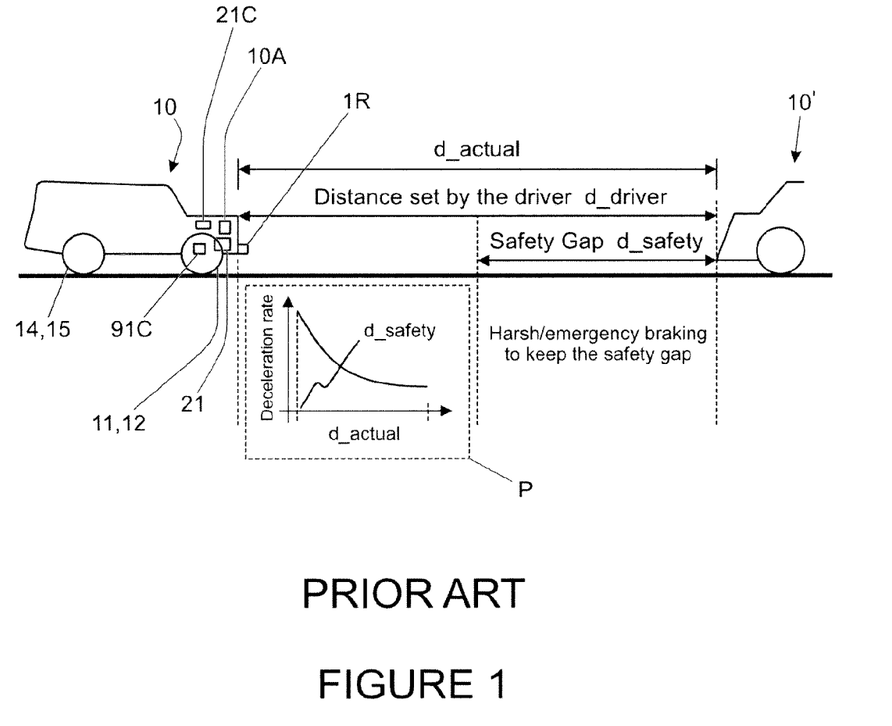
FIG. 1 is a schematic illustration showing a non-hybrid vehicle having a conventional adaptive cruise control system behind a followed vehicle.

FIG. 1 is a schematic illustration of a method by which conventional adaptive cruise control (ACC) systems operate. A host vehicle 10 equipped with an ACC system 10A is shown following a vehicle 10' (the followed vehicle). In the example shown a driver of the host vehicle 10 has set a distance d_driver as the distance which the host vehicle 10 is to maintain behind the followed vehicle 10'. The ACC system 10A is programmed to control a powertrain of the host vehicle 10 in order to maintain this distance. The ACC system 10A accomplishes this by detecting a distance between the host vehicle 10 and followed vehicle 10' by means of a radar module 1R. Responsive to the distance detected, the ACC system 10A communicates with an engine controller 21C to control an amount of torque developed by the engine 21 and a brake controller 91C to control an amount of brake torque applied to wheels 11, 12, 14, 15 of the vehicle 10. Plot P (shown inset in FIG. 1) is a plot of deceleration rate imposed on the vehicle by the ACC system 10A as a function of actual distance d_actual of the host vehicle 10 from the followed vehicle 10' for a particular rate of change of d_actual with respect to time. The deceleration rate imposed may also be a function of vehicle speed in some embodiments.

It can be seen from plot P that the deceleration rate increases sharply as d_actual falls towards a critical safety value d_safety, also referred to as a 'safety gap' value. As d_actual approaches d_safety the ACC system 10A imposes a maximum achievable rate of deceleration on the host vehicle 10 by means of the brake controller 91C in order to prevent collision with the followed vehicle 10. The application by the brake controller 91C of maximum deceleration by means of the brake controller 91C may be referred to as 'emergency braking'. In some arrangements engine braking may be employed in addition.

It is to be understood that conventional vehicles are not equipped with regenerative braking capability and the foundation brakes are provided by friction brakes. In a regenerative braking system, kinetic engine of a vehicle is converted to a form in which the energy can be stored, typically as charge in a charge storage device such as a battery, rather than being dissipated as heat as in the case of friction brakes. The amount of brake force that a regenerative braking system can develop is typically less than that available from a non-regenerative, friction braking system.

Figure 2:
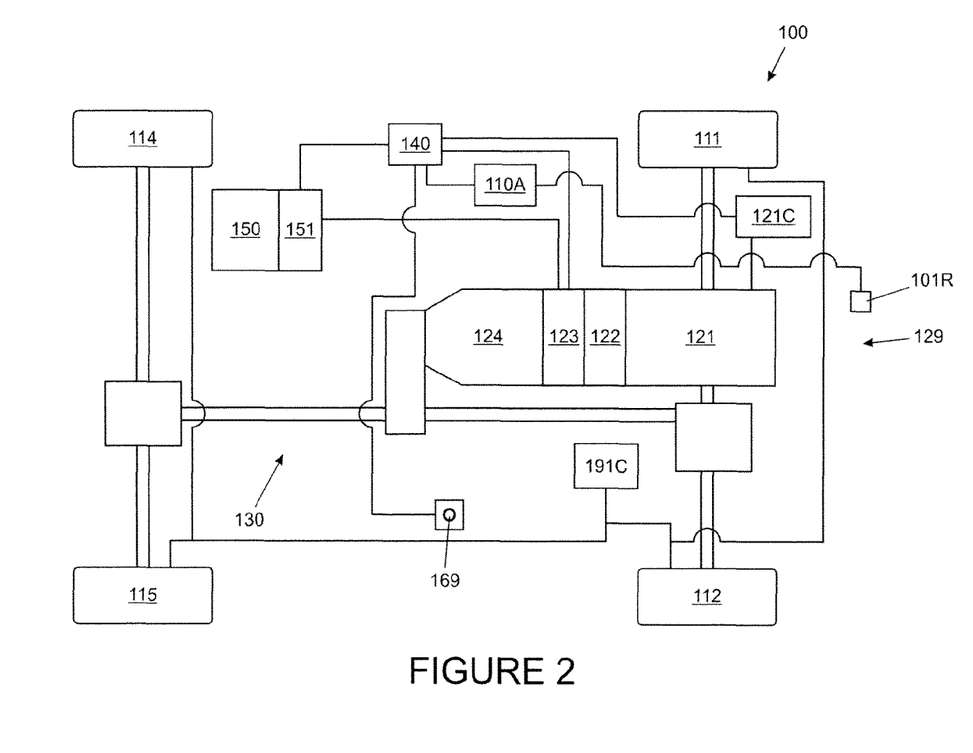
FIG. 2 is a schematic illustration of a hybrid electric vehicle (HEV) according to an embodiment of the present invention.

FIG. 2 shows a hybrid electric vehicle (HEV) 100 according to an embodiment of the present invention. The vehicle 100 has an internal combustion engine 121 and associated controller 121C. The engine 121 is releasably coupled to a crankshaft integrated motor/generator (CIMG) 123 by means of a clutch 122. The CIMG 123 is in turn coupled to an automatic transmission 124. It is to be understood that in some embodiments the transmission 124 may be a manual transmission instead of an automatic transmission. The transmission may comprise a manual gearbox, a continually variable transmission or any other suitable transmission.

The vehicle 100 is operable to provide drive torque to the transmission 124 by means of the engine 121 alone, the CIMG 123 alone or the engine 121 and CIMG 123 in parallel.

The vehicle may therefore be referred to as a parallel-type hybrid vehicle. However it is to be understood that embodiments of the invention are also suitable for use with series-type hybrid vehicles in which only one or more electric machines are operable to provide motive torque, i.e. operable as propulsion motors. In series-type hybrid vehicles an engine is provided for generating charge to power the one or more electric machines and not for providing direct drive torque. In some series-type hybrid vehicles the engine may be employed to generate charge to drive the one or more electric machines as propulsion motors whilst the one or more electric machines are providing propulsion to the vehicle in addition to or instead of charge delivered to the one or more propulsion motors from a battery of the vehicle. This is so as to enable a larger amount of electrical power to be delivered to the one or more electric machines. Embodiments of the invention are also useful in hybrid vehicles that operable in either of a parallel or series mode at a given moment in time.

It is to be understood that embodiments of the present invention are suitable for use with vehicles in which the transmission 124 is arranged to drive only a pair of front wheels 111, 112 or only a pair of rear wheels 114, 115, i.e. front wheel drive or rear wheel drive vehicles in addition to all wheel drive or selectable two wheel drive/four wheel drive vehicles. Embodiments of the invention are also suitable for vehicles having fewer than four wheels or more than four wheels.

The vehicle 100 has a battery 150 connected to an inverter 151 that generates a three-phase electrical supply that is supplied to the CIMG 123 when the CIMG 123 is operated as a motor. The battery 150 is arranged to receive charge from the CIMG 123 when the CIMG 123 is operated as a generator. The CIMG 123 may be operated as a generator in order to provide regenerative braking functionality in some embodiments. A brake controller 191C is arranged to control application of friction braking and/or regenerative braking according to a brake control methodology. According to the methodology, if the amount of braking required can be met by regenerative braking, regenerative braking is employed. If it cannot, then friction braking is employed.

The vehicle 100 is configured to allow a powertrain 129 of the vehicle 100 to operate in one of a hybrid electric vehicle (HEV) mode, an EV inhibit mode and a selectable electric vehicle only (EV-only) mode according to the state of a HEV mode selector 169.

In the HEV mode of operation the powertrain 129 is arranged to operate in one of a parallel boost mode, a parallel recharge mode, a parallel idle mode and a vehicle-selected EV mode.

In the parallel boost mode the engine 121 and CIMG 123 both apply positive torque to the transmission 124 (i.e. clutch 122 is closed) to drive the vehicle 100. In the parallel recharge mode the engine 121 applies a positive torque whilst the CIMG 123 applies a negative torque whereby charge is generated by the CIMG 123 to charge the battery 150. In the parallel idle mode the engine 121 applies a positive torque whilst the CIMG 123 applies substantially no torque. In the vehicle-selected EV mode (and in the driver selected EV-only mode) the clutch 122 is opened and the engine 121 is switched off.

The vehicle 100 has a controller 140 configured to control the powertrain 129 to operate in the parallel boost mode, parallel recharge mode or EV mode when operation of the vehicle 100 in the HEV mode is required. The controller 140 determines the required powertrain mode according to an energy management strategy implemented by the controller 140 and an amount of driver demanded torque. The energy management strategy may also be referred to as a HEV control methodology.

It is to be understood that when in HEV mode the controller 140 is configured to determine a target torque that is to be developed by each of the engine 121 and CIMG 123 at least in part in dependence on an amount of driver demanded torque at a given moment in time. The controller 140 then causes the engine 121 and CIMG 123 to apply the respective target torques to an input shaft of the transmission 124. For example, if the controller 140 determines that operation in vehicle-selected EV mode is required, the controller 140 sets the target torque from the engine 121 to zero and provides a control signal to switch off the engine 121. The CIMG 123 is then caused to meet the driver torque demand. If the controller 140 determines that both the engine 121 and CIMG 123 are required to apply positive torque to the driveline 130 the controller 140 causes the engine 121 and CIMG 123 to provide the required values of torque to the driveline 123. If the controller 140 determines that the battery 150 is required to be charged, the CIMG 123 is controlled to apply a negative torque to the driveline 130 such that the CIMG 123 acts as a generator to generate charge to charge the battery 150.

It is to be understood that other arrangements may also be useful.

If the driver selects operation in the EV inhibit mode, the controller 140 is configured not to allow automatic stopping of the engine 121. Rather, the controller 140 maintains the engine 121 running throughout the course of a drivecycle. In some embodiments, in EV inhibit mode the vehicle is controlled such that when drive torque is required the drive torque is delivered by the engine 121 alone or the engine 121 in combination with the CIMG 123. Use of the engine 121 in combination with the CIMG 123 may be particularly useful if the engine 121 alone is unable to develop sufficient drive torque to meet driver torque demand.

If the driver selects operation of the vehicle 100 in EV-only mode and the engine 121 is running, the vehicle 100 is configured to open the clutch 122 and to switch off the engine 121. Again, the CIMG 123 is then operated either as a motor or as a generator. It is to be understood that the CIMG 123 may be arranged to act as a generator in the EV-only mode in order to effect regenerative braking of the vehicle 100 and emulate over-run/compression baking torque. However, operation of the CIMG 123 to effect regenerative braking is not limited to the EV-only mode and may be employed in any powertrain mode or vehicle mode.

The vehicle 100 has an adaptive cruise control (ACC) system 110A operable to implement an adaptive cruise control methodology. When the vehicle 100 (host vehicle) is behind a followed vehicle 100' (FIG. 3(a)) the system 110A is configured to allow a driver to set a driver desired distance d_driver from the followed vehicle 100' being the distance the driver wishes to maintain behind the followed vehicle 100'. In the present embodiment, the driver selects one of three distance settings (setting 1, setting 2 or setting 3) corresponding to successively greater following distances. The actual values to which d_driver is set depending on whether setting 1, setting 2 or setting 3 is selected is calculated by the ACC system 110A according to the speed of the vehicle 100. The greater the speed of the vehicle, the greater the value of d_driver set by the system 110A under a given setting. Other arrangements are also useful, such as other numbers of settings. In some embodiments only one setting is available, whilst in others including the present embodiment a plurality of settings are available.

In some embodiments, in addition or instead the ACC system 110A may be operable to allow the driver to command the system 110A to maintain a distance behind the followed vehicle 100' corresponding to a current distance of the following (or host) vehicle 100 behind the followed vehicle 100', i.e. d_driver is set to the current distance behind the followed vehicle 100'. The value of d_driver may subsequently be adjusted by the system 110A as a function of speed of the vehicle 100 in some embodiments.

In a normal (or conventional) cruise mode of operation of the system 110A, the ACC system 110A is arranged to maintain a distance behind the followed vehicle 100' that is substantially equal to d_driver. Information in respect of a distance between the host vehicle 100 and followed vehicle 100' is obtained by means of a radar sensor 101R. The system 110A then attempts to maintain the vehicle at a target distance d_target behind the followed vehicle 100', where d_target is set to the value of d_driver.

The ACC system 110A is also operable in an economy (or ECO) mode of operation. In this mode the driver is again able to set a value of d_driver. However, the ACC system 110A is arranged to determine a value of a gap, d_ECO, which may be referred to as an 'ECO cruise gap', being a distance that is to be added to the driver desired distance d_driver to obtain a target distance d_target. Thus, d_target=d_driver+d_ECO. The target distance d_target is the distance that the host vehicle 100 is subsequently controlled to maintain behind the followed vehicle 100' by the ACC system 110A.

In order to calculate the value of d_ECO the ACC system 110A is configured to monitor a driving style of the followed vehicle 100' and to determine an 'expected' value of deceleration decel_expected of the followed vehicle 100' being a value of deceleration that the followed vehicle 100' is likely to assume at any given moment in time. Optionally the estimated value of decel_expected may be determined as a function of speed of the followed vehicle 100', i.e. the ACC system 110A may be operable to determine a value of decel_expected taking into account a current speed of the vehicle 100.

The ACC system 110A continuously updates or refines the value of decel_expected when following a particular followed vehicle 100' based on measured values of deceleration of the followed vehicle 100'.

In some embodiments the ACC system 110A may also estimate a time period for which the expected deceleration rate is likely to be assumed by the followed vehicle 100' at any given moment in time. The estimate of the time period may be based on historical data. Responsive to this information the ACC system 110A may be able to determine a value of the gap d_ECO that should be established between the host vehicle 100 and followed vehicle in addition to d_driver in order to maintain at least a distance d_driver from the followed vehicle 100' using only regenerating braking. In some embodiments a parameter decel_max_regen stores a current maximum value of deceleration of the vehicle 100 that is achievable by regenerative braking alone. It is to be understood that in some embodiments the value of decal_max_regen may vary in dependence on one or more vehicle parameters such as battery state of charge, and may be updated substantially in real time. The parameter may be generated by the ACC system 110A or by the brake controller 191C.

In the present embodiment the value of d_ECO is capped at a prescribed maximum value d_ECO_max. If the value of decel_max_regen is such that the required value of d_ECO exceeds d_ECO_max, the ACC system 110A is configured to set the value of d_ECO to d_ECO_max and to supplement the braking torque provided by the regenerative braking means with braking torque provided by the non-regenerative braking means if required.

The value of d_ECO is calculated as follows in an ACC system 110A according to the present embodiment:

$$d\_ECO = \max\left\{\min\left[d\_driver \times \frac{decel\_expected - decel\_max\_regen}{decel\_max\_regen}; d\_ECO\_max\right]; 0\right\}$$

If decel_max_regen is less than a critical minimum value decel_max_regen_min the ACC system 110A is configured to exit ECO cruise mode and operate according to the normal cruise mode, i.e. d_ECO_max is set to zero. In some embodiments a corresponding warning may be provided to a driver of the vehicle to inform him or her that this action has been taken.

It is to be understood that, after determining a value of d_ECO and establishing a distance behind the followed vehicle substantially equal to (d_ECO+d_driver), if the followed vehicle 100' brakes at the expected deceleration rate and the host vehicle applies available regenerative braking, the ACC system 110A should be capable of maintaining a distance of the host vehicle 100 behind the followed vehicle 100' of at least d_driver without a requirement to apply friction braking.

Thus if the actual distance d_actual of the host vehicle 100 behind the followed vehicle 100' is between d_target and d_driver, the ACC system 110A is configured to employ only regenerative braking in order to slow the host vehicle to maintain the value of d_actual as close as possible to d_target. This feature is found to increase an efficiency with which a vehicle 100 may be operated.

As noted above, in order to determine the value of d_ECO, the ACC system 110A is configured to calculate a value of a maximum available deceleration rate decel_max_regen that may be provided by regenerative braking alone at a given moment in time. The value of decel_max_regen is determined by the brake controller 191C responsive to the following parameters:
 a) a value of host vehicle mass, mass_veh;
 b) a value of driving surface slope, slope_driv, based on vehicle location and corresponding map data;
 c) a value of a charging torque limit of the CIMG 123, chg_tq_lim; and
 d) a value of current speed of the host vehicle 100, speed_host.

It is to be understood that in some embodiments the controller 140 may be arranged to employ estimated or actual values of mass_veh, slope_driv, chg_tq_lim and speed_host.

It is to be understood that the charging torque limit corresponds to a maximum amount of torque that may be generated by the CIMG 123 acting as a generator to effect regenerative braking. The value of chg_tq_lim is typically found to decrease as the state of charge SOC of a battery 150 approaches the maximum allowable state of charge.

Figure 3:
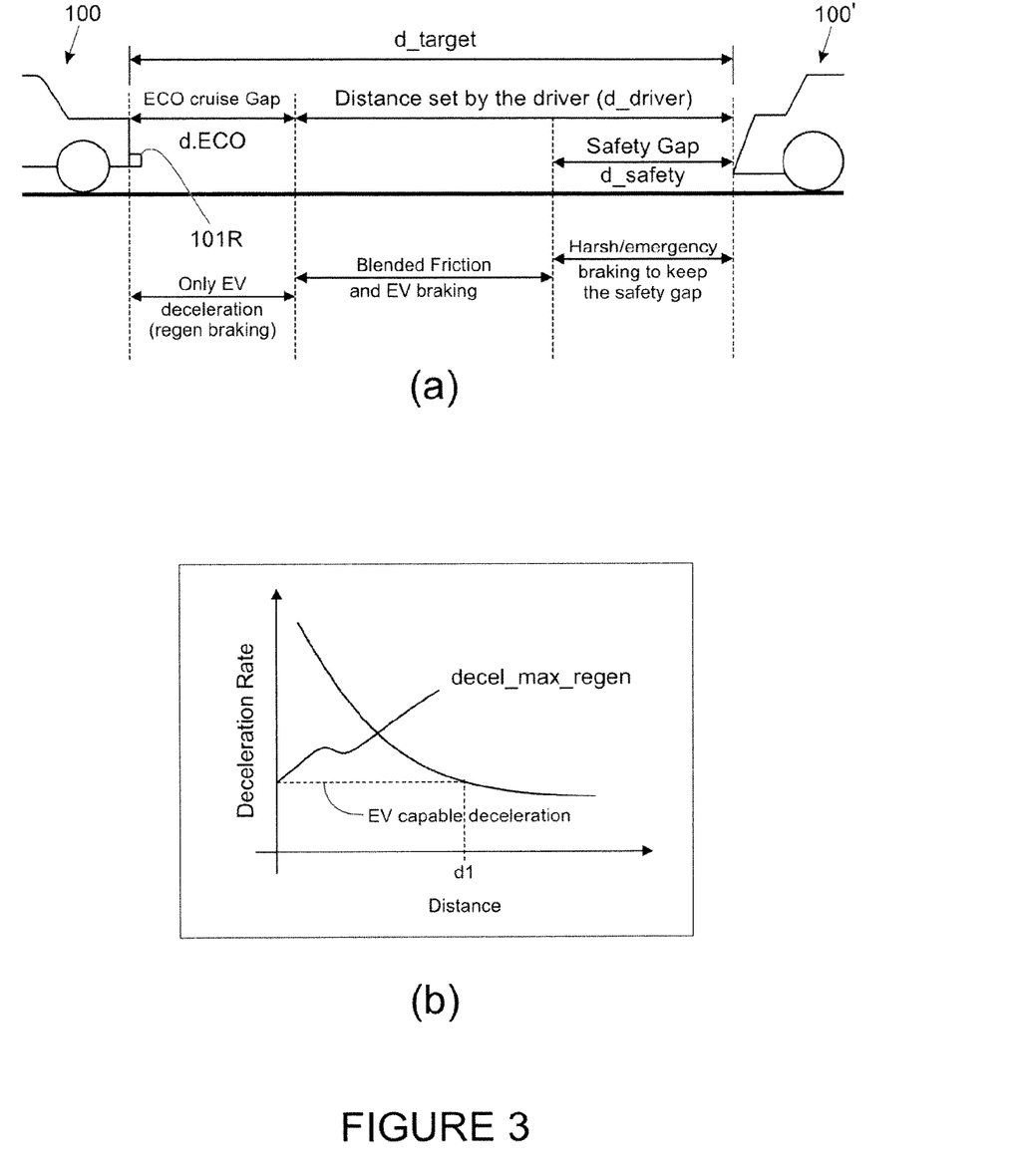

FIG. 3(b) shows a plot of deceleration rate imposed on the host vehicle 100 by the ACC system 110A as a function of distance from the followed vehicle 100'. A value of decel_max_regen is shown on the plot. It is to be understood that the value of decel_max_regen may vary during the course of a given drivecycle as discussed above.

The distance d1 of the host vehicle 100 from the followed vehicle 100' at which the deceleration rate imposed by the ACC system 110A is equal to the maximum instantaneous value of deceleration rate achievable by regenerative braking is indicated on the figure. It is to be understood that in order to attempt to ensure that sufficient regenerative braking capability is available to maintain a distance from the followed vehicle 100' of at least d_driver, the value of d_ECO should ideally be a value sufficiently large to maintain the vehicle at a distance behind the followed vehicle 100' of at least d1 at substantially all times.

It is to be understood that if the ACC system 110A determines that a rate of deceleration of the followed vehicle 100' exceeds a threshold value the ACC system 110A may command the brake controller 191C to employ non-regenerative braking means even if the actual distance of the host vehicle behind the followed vehicle 100' exceeds the driver desired distance d_driver.

In some alternative embodiments that determine d_ECO at least in part by reference to an expected value of deceleration decel_expected of the followed vehicle, decel_expected may be calculated taking into account a mean value of deceleration of the followed vehicle 100'. Optionally decel_expected may be determined in dependence on a mean value of deceleration of a followed vehicle 100' over a predetermined preceding time period such as a preceding minute. The value of decel_expected may be set substantially equal to this mean value in some embodiments. Alternatively or in addition decel_expected may be calculated taking into account the largest value of deceleration of a given followed vehicle 100' that has been observed by the system 110A. Other arrangements are also useful. In some embodiments the value of decel_expected is then converted to a value of d_ECO, for example by multiplying the value of decel_expected (in meters per second per second) by a d_ECO conversion factor F such as 10, 15, 20 or any other suitable value and setting the value of d_ECO to the resulting value, in meters.

Thus if the value of decel_expected is 2 ms-2 and the value of F is 10, the value of d_ECO would be set to 20 m. Other arrangements are also useful. The value of factor F may be set in dependence on vehicle speed, the value of F being arranged to increase with increasing vehicle speed. In some embodiments the value of F may be set numerically equal to vehicle speed (in kph or mph) divided by 5, or any other suitable value. Other arrangements are also useful.

As noted above, in some embodiments the ACC system 110A may take into account the amount of time for which a followed vehicle brakes at a given rate when determining the value of d_ECO. In some embodiments the ACC system 110A may convert a measured value of this time period into a further multiplication factor F2, for example by rounding up the time period to the nearest second, and setting the value of F2 numerically equal to this time period in seconds. Other arrangements are also useful.

It is to be understood that embodiments of the present invention may have the advantage that they reduce a likelihood that the amount of braking required by the ACC system 110A exceeds that which may be provided by regenerative braking alone. This is achieved in some embodiments by increasing the distance that the host vehicle is required to maintain behind a followed vehicle above the driver desired distance and applying braking using only regenerative braking provided the actual distance behind the host vehicle does not fall below the driver desired distance.

Throughout the description and claims of this specification, the words "comprise" and "contain" and variations of those words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An adaptive cruise control (ACC) system for a host motor vehicle, the host motor vehicle having a regenerative braking system, a non-regenerative braking system, a brake controller configured to control the regenerative braking system and the non-regenerative braking system, a powertrain, a powertrain controller configured to control the powertrain, an input device, and a sensor configured to obtain information in respect of a distance between the host vehicle and a followed vehicle,
wherein the ACC system is configured to:
communicate with the brake controller, the powertrain controller and the sensor to control the powertrain and the regenerative and non-regenerative braking systems of the host vehicle to:
maintain the distance between the host vehicle and the followed vehicle at a target distance, the target distance being substantially equal to a second distance that is greater than a first distance; and
employ only the regenerative braking system to slow the host vehicle so as to maintain the host vehicle at the target distance when a distance of the host vehicle behind the followed vehicle is greater than the first distance; and
communicate with said input device and to determine the first distance from an input provided by a user via said user input device.

2. The ACC system of claim 1, further configured to allow a user to select the first distance from a plurality of respective different distances.

3. The ACC system of claim 1, wherein the system is configured to communicate with a speed sensor of the vehicle and the system is further configured to determine a value of the first distance and wherein the value is dependent on a speed of the host vehicle.

4. The ACC system of claim 1, further configured to allow a user to set the first distance to be a distance corresponding substantially to a current distance of the host vehicle behind the followed vehicle via said user input device.

5. The ACC system of claim 1, further configured to communicate with said powertrain controller to control the powertrain such that a blended combination of the regenerative and non-regenerative braking systems is employed to slow the host vehicle when required when the distance of the host vehicle behind the followed vehicle is less than the first distance.

6. The ACC system of claim 3, wherein the value of the second distance is dependent upon one or more of the following: a value of the first distance, a mass of the host vehicle, an inclination of a driving surface, and a speed of the host vehicle.

7. The ACC system of claim 3, further configured to determine a value of a gap parameter, the gap parameter being a distance that is to be added to the first distance in order to determine the second distance.

8. The ACC system of claim 7, wherein the system is configured to communicate with said brake controller to determine a value of a maximum vehicle deceleration rate that is available via the regenerative braking system, and the value of the gap parameter is dependent on the value of the maximum vehicle deceleration rate, the value of the gap parameter being arranged to increase as a magnitude of the maximum vehicle deceleration rate decreases.

9. The ACC system of claim 7, wherein the system is arranged to obtain data in respect of a rate of deceleration of the followed vehicle, and the value of the gap parameter is dependent on a value of an expected rate of deceleration of the followed vehicle, the value of the expected rate of deceleration being determined in dependence on historical data in respect of the rate of deceleration of the followed vehicle, the value of the gap parameter being arranged to increase with increasing values of expected rate of deceleration.

10. The ACC system of claim 1, wherein an amount by which the target distance may exceed the first distance is limited to a maximum prescribed increment value.

11. The ACC system of claim 7, wherein the value of the gap parameter is limited to a value of a maximum prescribed increment value.

12. The ACC system of claim 1, wherein, in a first mode, the ACC system is configured to maintain the host vehicle at a target distance behind the followed vehicle substantially equal to the second distance, and wherein, in a second mode, the ACC system is configured to maintain the host vehicle at a target distance behind the followed vehicle substantially equal to the first distance.

13. The ACC system of claim 12, wherein, when in the second mode, the ACC system communicates with said brake controller to employ the non-regenerative braking system to slow the host vehicle in order to maintain the first distance behind the followed vehicle.

14. A vehicle, comprising:
a regenerative braking system;
a non-regenerative braking system;
a brake controller configured to control the regenerative braking system and the non-regenerative braking system;
a powertrain;
a powertrain controller configured to control said powertrain;
an input device;
a sensor configured to determine a distance between the host vehicle and a followed vehicle; and
an ACC system, configured to:
communicate with the brake controller, the powertrain controller and the sensor to control the powertrain and the regenerative and non-regenerative braking systems of the host vehicle to:
maintain the distance between the host vehicle and the followed vehicle at a target distance, the target distance being substantially equal to a second distance that is greater than a first distance; and
employ only the regenerative braking system to slow the host vehicle so as to maintain the host vehicle at the target distance when a distance of the host vehicle behind the followed vehicle is greater than the first distance; and
communicate with said input device and to determine the first distance from an input provided by a user via said user input device.

15. The vehicle of claim 14, wherein the vehicle is a hybrid electric vehicle or an electric vehicle.

16. A method of controlling a host vehicle having a powertrain, regenerative and non-regenerative braking systems, a brake controller, a powertrain controller, and a sensor configured to obtain information in respect of a distance between the host vehicle and a followed vehicle, the method comprising:

controlling the powertrain and the regenerative and non-regenerative braking systems, via the powertrain controller and brake controller respectively, to maintain the host vehicle at a target distance behind the followed vehicle, the target distance being substantially equal to a second distance that is greater than a first distance; and when braking is required to maintain the target distance, employing substantially only the regenerative braking system to slow the host vehicle when an actual distance behind the followed vehicle, as determined by the sensor, is greater than the first distance, wherein the first distance is determined from an input provided by a user.

17. An adaptive cruise control (ACC) system for a host motor vehicle, the host motor vehicle having a regenerative braking system, a non-regenerative braking system, a brake controller configured to control the regenerative braking system and the non-regenerative braking system, a powertrain, a powertrain controller configured to control the powertrain, an input device, and a sensor configured to obtain information in respect of a distance between the host vehicle and a followed vehicle, wherein the ACC system is configured to communicate with the brake controller, the powertrain controller and the sensor to control the powertrain and the regenerative and non-regenerative braking systems of the host vehicle to:

maintain the distance between the host vehicle and the followed vehicle at a target distance, the target distance being substantially equal to a second distance that is greater than a first distance; and employ only the regenerative braking system to slow the host vehicle so as to maintain the host vehicle at the target distance when a distance of the host vehicle behind the followed vehicle is greater than the first distance, wherein the system is arranged to communicate with said brake controller to determine a value of a maximum vehicle deceleration rate that is available via the regenerative braking system, and the value of the gap parameter is dependent on the value of a maximum vehicle deceleration rate that is available via the regenerative braking system, the value of the gap parameter being arranged to increase as a magnitude of the maximum available deceleration rate decreases.

18. An adaptive cruise control (ACC) system for a host motor vehicle, the host motor vehicle having a regenerative braking system, a non-regenerative braking system, a brake controller configured to control the regenerative braking system and the non-regenerative braking system, a powertrain, a powertrain controller configured to control the powertrain, an input device, a speed sensor, and a sensor configured to obtain information in respect of a distance between the host vehicle and a followed vehicle, wherein the ACC system is configured to communicate with the brake controller, the powertrain controller and the sensor to control the powertrain and the regenerative and non-regenerative braking systems of the host vehicle to:

maintain the distance between the host vehicle and the followed vehicle at a target distance, the target distance being substantially equal to a second distance that is greater than a first distance; and employ only the regenerative braking system to slow the host vehicle so as to maintain the host vehicle at the target distance when a distance of the host vehicle behind the followed vehicle is greater than the first distance, wherein the system is arranged to communicate with said speed sensor and to obtain data in respect of the rate of deceleration of the followed vehicle, and the value of the gap parameter is dependent on a value of an expected rate of deceleration of the followed vehicle, the value of the expected rate of deceleration being determined in dependence on historical data in respect of the rate of deceleration of the followed vehicle, the value of the gap parameter being arranged to increase with increasing values of expected rate of deceleration.

* * * * *